Figure 8:
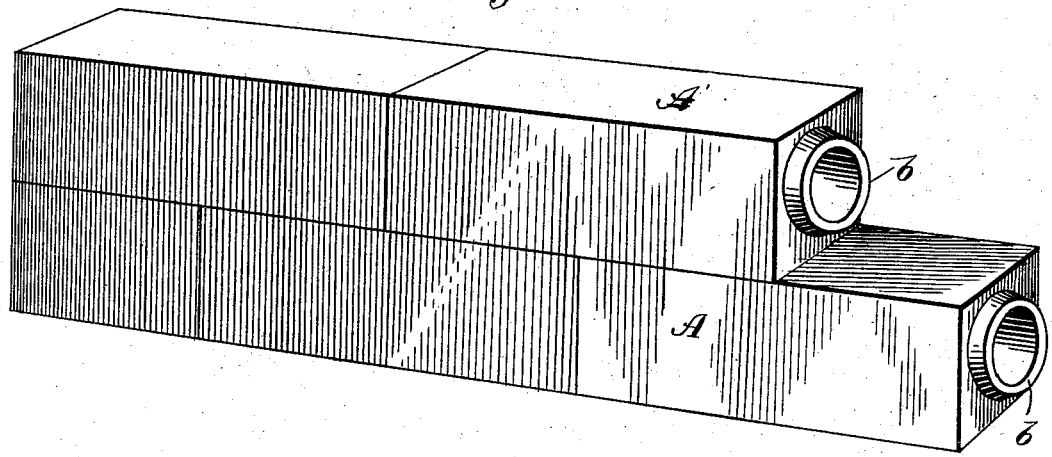

(No Model.) 3 Sheets—Sheet 1.
G. RICHARDSON.
UNDERGROUND CONDUIT FOR ELECTRIC CONDUCTORS.
No. 259,045. Patented June 6, 1882.
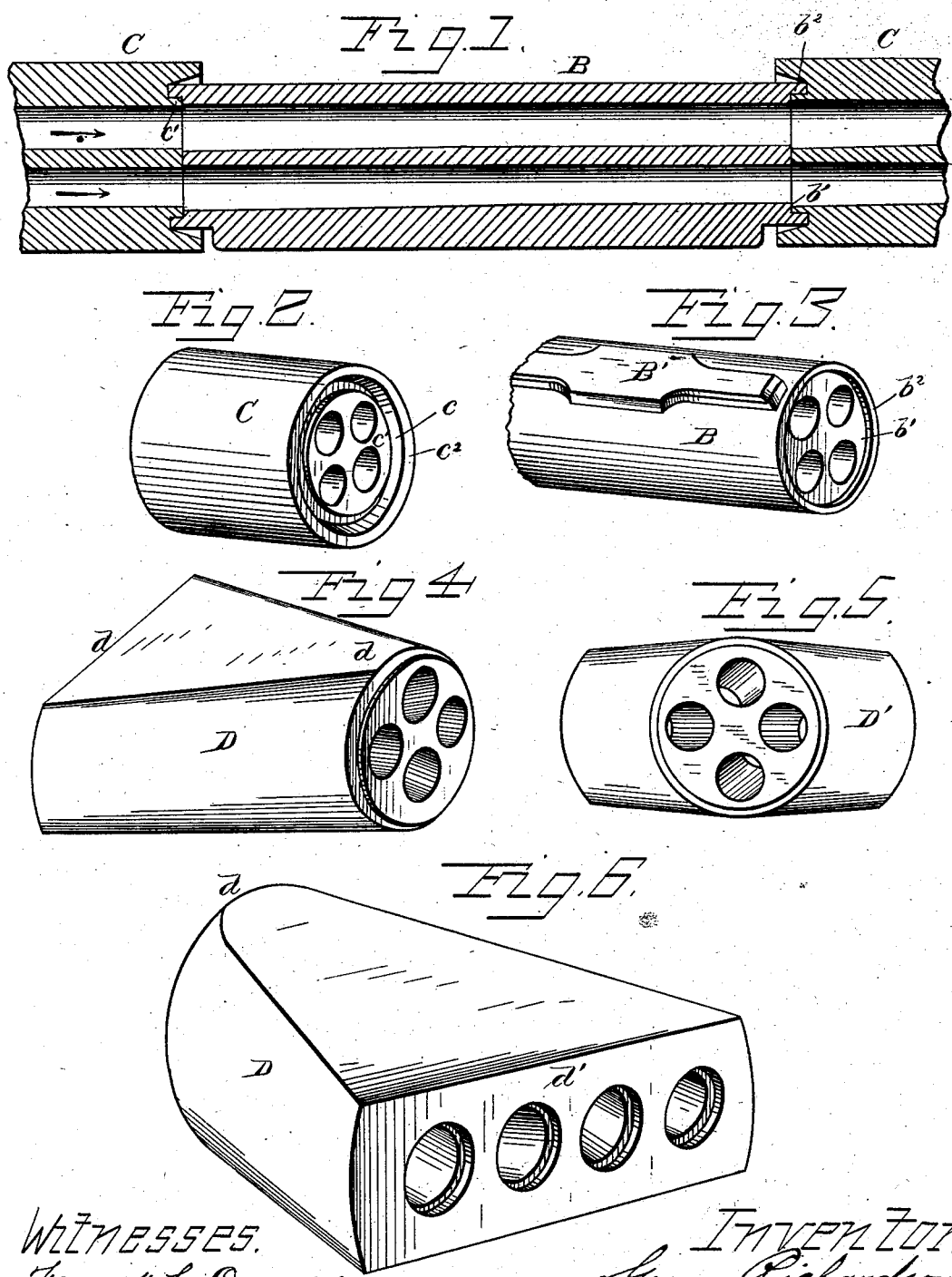
Witnesses.
Franck L. Ourand.
F. McMahon
Inventor.
George Richardson
by his attorney (No Model.)
3 Sheets—Sheet 2.
G. RICHARDSON.
UNDERGROUND CONDUIT FOR ELECTRIC CONDUCTORS.
No. 259,045.
Patented June 6, 1882.
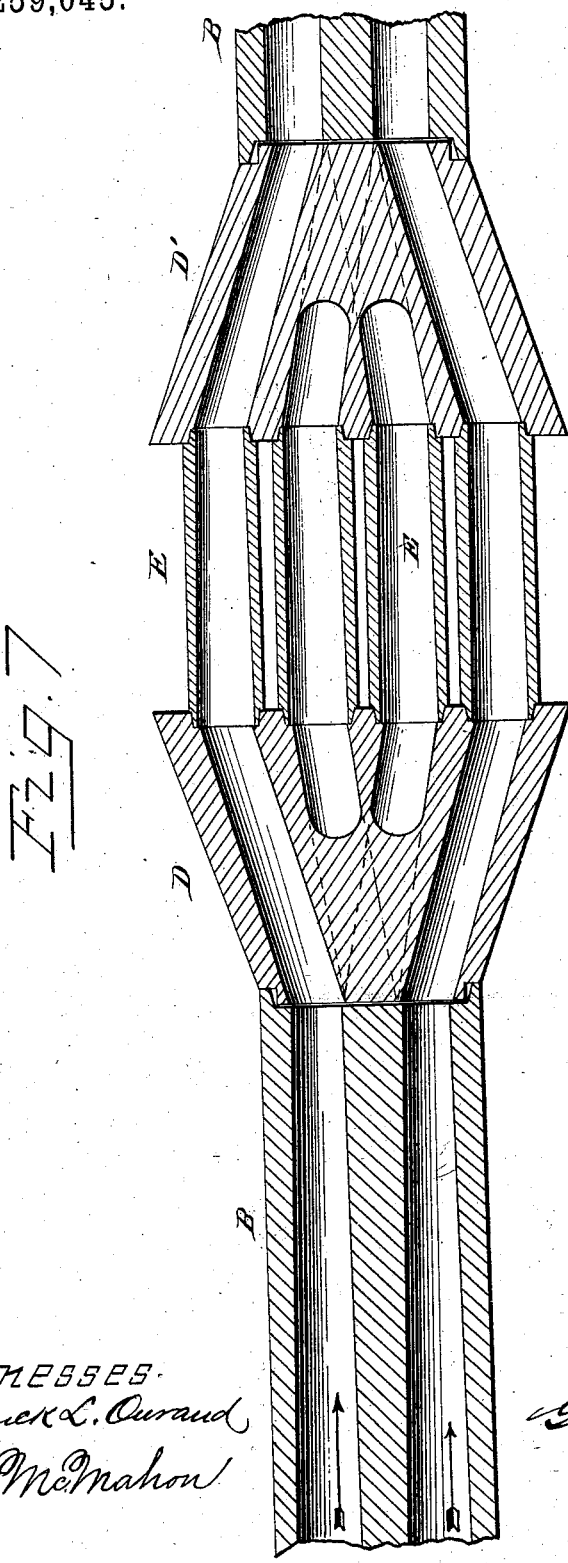

(No Model.) 3 Sheets—Sheet 3.

G. RICHARDSON.
UNDERGROUND CONDUIT FOR ELECTRIC CONDUCTORS.

No. 259,045. Patented June 6, 1882.

Witnesses.
A. Ruppert.
F. McMahon.

Inventor.
George Richardson
by his attorney

UNITED STATES PATENT OFFICE.

GEORGE RICHARDSON, OF PHILADELPHIA, PENNSYLVANIA.

UNDERGROUND CONDUIT FOR ELECTRIC CONDUCTORS.

SPECIFICATION forming part of Letters Patent No. 259,045, dated June 6, 1882.

Application filed April 7, 1882. (No model.)

*To all whom it may concern:*

Be it known that I, GEORGE RICHARDSON, a citizen of the United States, residing at Philadelphia, in the county of Philadelphia and State of Pennsylvania, have invented certain new and useful Improvements in Underground Conduits for Electrical Conductors; and I do hereby declare the following to be a full, clear, and exact description of the invention, such as will enable others skilled in the art to which it appertains to make and use the same.

This invention relates to underground conduits for insulated telegraph-wires or other electrical conductors, composed of tubular sections of earthenware or cement pipes jointed together.

One feature of my invention consists in making the flue or flues of such pipes somewhat tapering, and connecting the pipes in such a manner that the larger end of the flue or flues of each pipe shall abut against and encircle the smaller end of the flue of the next adjacent pipe, the line of pipes being so laid that the flue of each section of pipe will taper in the direction in which the cable or insulated conductor is to be drawn through it, so as to prevent slight imperfections in the bore or flue of the pipes at the joints and in the alignment of the pipes from forming projections at such joints, which projections would tend to obstruct the threading of the conductor through the conduit, and might injure the insulating material around the conductor in being drawn through it.

Another feature of my invention consists of a coupling-section for multitubular or multiflue pipes, which is adapted to carry a circular or compact or clustered group of electrical conductors, the coupling-section being so constructed as to receive the compact or clustered group of conductors at one end and deliver them at the other end in a single row, in order to pass permanent obstructions—such as gas or water pipes—that may happen to be crossing the general line of the conduit.

Another feature of my invention consists of the combination of a multiflue pipe constructed with a circular recess in its end and a multiflue coupling-section constructed with an annular recess in its end for the reception of the reduced end of the pipe.

Another feature of my invention consists of an underground conduit composed of several lines of single-flue pipes, constructed with tapering flues and flat sides, one line of pipe being placed upon the flat side of the line of pipes beneath it.

In order that my invention may be clearly understood, I have illustrated in the annexed drawings and will proceed to describe the best form thereof at present known to me.

Figure 9:
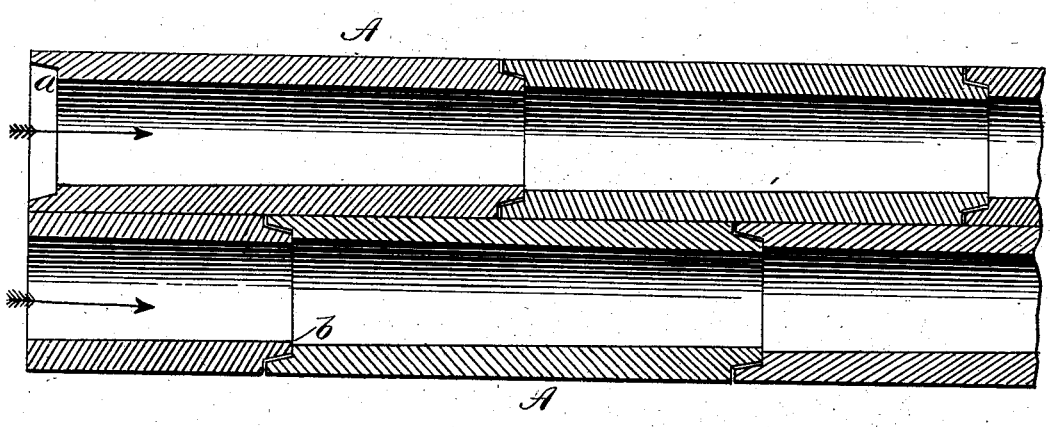

Figure 1 is a longitudinal section of a portion of a conduit composed of multiflue pipes and coupling-section. Fig. 2 is a perspective view of a multiflue coupling-section for connecting multiflue pipes without changing the arrangement of the electrical conductors as determined by the pipe. Fig. 3 is a perspective view of a portion of a multiflue pipe. Figs. 4, 5, and 6 illustrate a multiflue coupling-section for changing the arrangement of the electrical conductors from the arrangement determined by the multiflue pipe. Fig. 7 is a longitudinal section of a multiflue conduit, two pipe-sections of which are connected by a pair of multiflue coupling-sections and interposed pipe-sections by which the electrical conductors are carried for some distance in a row instead of in a compact or clustered group, as in the pipe-sections. Fig. 8 is a perspective view of a portion of two lines of pipe, one superposed upon the other. Fig. 9 is a longitudinal section of such two lines of pipe.

The same letters of reference are used in all the figures to designate identical parts.

In the practical application of my invention I prefer to use pipes and coupling-sections made of hydraulic cement, although terra-cotta pipes and coupling-sections of similar construction may be employed. Whatever style of pipe or coupling-section may be used or required, the flue or flues thereof are made somewhat tapering, as clearly shown in Figs. 1, 7, and 9, and the pipes and coupling-sections must be so laid that the flues will taper in the direction in which the insulated electrical conductor is to be drawn through the conduit, such direction being indicated by the arrows of said figures.

In case the underground conduit is constructed of single-flue pipes, I use pipes A, having at least two flat sides, one opposite to the other, preferably square pipes, in order that several lines may be readily built up, as shown in Figs. 8 and 9. It is preferable to so lay the pipes that those of one line will break joints with those of the adjacent lines. Each pipe is constructed with a socket, $a$, at the larger end of its bore or flue, and with a tenon, $b$, at the smaller end thereof. This being adhered to, no mistakes can be made in laying the pipes regarding the direction of the taper of their flues after the line has been once properly started.

For constructing conduits composed of multiflue pipes I use multiflue pipes B, preferably of cylindrical form, containing any desired number of flues arranged in a circular or compact or clustered group. These multiflue pipes are connected together by short coupling-sections C, made somewhat larger in diameter. An annular recess, $c$, is formed in each end of this coupling-section. The portion $c'$ of the coupling-section within the inner circle of this annular recess is made flat at the end. The portion $c^2$ of the coupling-section around the outer circle of this annular recess projects some distance beyond the portion $c'$. Thus each end of the coupling-section is constructed with what may be termed an "annularly-recessed" socket. To fit the coupling-sections C, the pipe B is constructed at each end with a socket, $b'$, to receive the inner projecting portion, $c'$, and enter the annular recess $c$ thereof, with the rim $b^2$ encircling the socket $b'$. The bottom of the socket $b'$ is made flat, so that it may fit snugly against the flat end $c'$ of the coupling-section C. In joining the coupling-section to the pipe a film of cement may be spread on the solid portions of the end $c'$ of the coupling-section and the bottom of the socket $b'$ of the pipe to cement them together endwise, as well as by the cement laid around the end of the pipe in the recess ot the coupling-section. Since the pipe B is ot less diameter than the coupling-section C, and both are preferably laid on level ground or a level foundation, the pipe is constructed with a sole, B', at the bottom side to make that side flush with the bottom side of the coupling-section, which may also be flattened somewhat, so as to lie steady. Both the multiflue coupling-sections C and multiflue pipes B must be so jointed that their flues will register as perfectly as practicable. To this end they should be carefully constructed and provided with suitable registering-marks, and the mark at one end should differ from the mark at the other end, so that they may be readily laid in the proper direction as regards the taper of their flues.

In order that a circular or compact or clustered group of conductors may be carried for a distance in a single row for the purpose of passing permanent obstructions—such as gas and water pipes—crossing the general line of the conduit, I provide coupling-sections D D', which are constructed at one end, $d$, to fit the pipes B, and are flattened toward the other end, $d'$, to the required width for ranging the compact or clustered group of flues at end $d$ in a row at the end $d'$. In the coupling-section D the flues taper from the end $d$ to the end $d'$, while in the coupling-section D' the flues taper from the end $d'$ to the end $d$. The flat ends $d'$ of these coupling-sections may be connected either by a flat multiflue pipe—one or a series, according to the distance through which the conductors are to be carried in a row—or by the single-flue pipes E shown in the drawings, Fig. 7. I have shown these coupling-sections D D' as made straight; but they may be made curved or angling to provide for deflections in the conduit.

In constructing a conduit according to my invention suitable man-holes will be provided at intervals along the line thereof, so that access may be had to the conduit for laying and stretching the electrical conductors or for looping or testing any of them.

Any known stretching device may be used for stretching the conductors; but I prefer to use a stretcher which I have invented for this special purpose, and which will be made the subject of another patent.

Having thus described my invention, what I claim is—

1. A conduit for electrical conductors, composed of sections having tapering flues for the conductors, and laid with the ends of lesser bore of one section connected to the end of greater bore of the next adjacent section, substantially as before set forth.

2. A multiflue coupling the flues of which are arranged, as described, so as to be in a compact or clustered group at one end and in a row at the other end, substantially as before set forth.

3. In a conduit for electrical conductors, the combination, substantially as before set forth, of a multiflue pipe the flues of which are arranged in a compact or clustered group, a multiflue coupling the flues of which change from a compact or clustered group at the end connected to said pipe to a single row at the other end, a second similarly-constructed pipe and connected coupling, and a multiflue pipe the flues of which are arranged in a row for connecting the ends of the couplings at which their flues are arranged in a row.

4. In an underground conduit for electric conductors, the combination of main sections of multiflue pipe, such sections being provided at each end with a socket or recess and having a projecting rim encircling the same, with coupling-sections of larger diameter than the main sections, and having in each end a groove surrounding the flues, of the same size as the projecting rim of the main sections, and a rim or flange exterior to said groove and tapering outward to the edge, whereby the main sections may be closely fitted into the coupling-section, the bottom of the recess in the main sections cemented against or to the corresponding face of the coupling-section, and space left between the projecting flange or rim of the latter and the outside of the main section for binding-cement, substantially as shown and described.

5. An underground conduit for electrical conductors, composed of separate lines of sectional pipes having a flat bottom and a flat top, and each section provided with tapering flues, the sections being laid with the end of lesser bore of one connected to the end of greater bore of the next adjacent one, and the lines of pipe being laid one on top of the other, substantially as before set forth.

In testimony whereof I affix my signature in presence of two witnesses.

GEORGE RICHARDSON.

Witnesses:
B. E. J. EILS,
THEO. MUNGEN.